(12) United States Patent
Jones et al.

(10) Patent No.: US 6,697,737 B2
(45) Date of Patent: Feb. 24, 2004

(54) QUALITY CONTROL CUBE FOR SEISMIC DATA

(75) Inventors: Neil Jones, Richmond (GB); Andrew Ashby, Twickenham (GB); Ronald E. Chambers, Houston, TX (US)

(73) Assignee: WesternGeco LLC, Houston, TX (US)

( * ) Notice: Subject to any disclaimer, the term of this patent is extended or adjusted under 35 U.S.C. 154(b) by 0 days.

(21) Appl. No.: 09/961,505

(22) Filed: Sep. 24, 2001

(65) Prior Publication Data

US 2002/0072856 A1 Jun. 13, 2002

Related U.S. Application Data

(60) Provisional application No. 60/235,664, filed on Sep. 26, 2000.

(51) Int. Cl.$^7$ .................................................. G01V 1/28
(52) U.S. Cl. ................................................. 702/2; 703/10
(58) Field of Search ............................. 367/19, 20, 68, 367/21, 50, 72; 702/14, 2, 16; 703/10

(56) References Cited

U.S. PATENT DOCUMENTS

| | | | |
|---|---|---|---|
| 4,561,073 A | 12/1985 | Brands Aeter et al. | 367/19 |
| 4,635,237 A | 1/1987 | Benestad et al. | 367/20 |
| 4,663,743 A | 5/1987 | Rampuria et al. | 367/68 |
| 4,682,307 A | 7/1987 | Newman | 367/21 |
| 4,759,636 A | 7/1988 | Ahern et al. | 367/21 |
| 4,787,069 A | 11/1988 | Beauducel et al. | 367/21 |
| 5,586,026 A | * 12/1996 | Highnam et al. | 702/16 |
| 5,671,136 A | 9/1997 | Willhoit, Jr. | 364/421 |
| 5,870,691 A | * 2/1999 | Partyka et al. | 702/16 |
| 5,920,828 A | 7/1999 | Norris et al. | 702/14 |
| 5,966,672 A | * 10/1999 | Knupp | 702/16 |
| 5,986,974 A | 11/1999 | Luo et al. | 367/41 |
| 6,208,587 B1 | * 3/2001 | Martin | 367/50 |

FOREIGN PATENT DOCUMENTS

| | | |
|---|---|---|
| WO | WO 99/03004 | 1/1999 |
| WO | WO 00/02155 | 1/2000 |
| WO | WO 0019241 | 4/2000 |

* cited by examiner

Primary Examiner—John Barlow
Assistant Examiner—Victor J. Taylor
(74) Attorney, Agent, or Firm—Madan, Mossman & Sriram, P.C.

(57) ABSTRACT

Attributes of a seismic data set that are indicative of the quality of the seismic data are displayed in a quality control (QC) hypercube. The axes of the hypercube may be the source position, the source line, the receiver position and a processing step. In a pre-migration QC cube, two of the three axes of the cube are defined by the locations of seismic data. In a migrated QC cube, two of the three axes are defined by the migrated output bin position of processed seismic data. The third axis of the cube contains information about the quality of the data. The QC attributes may be simple amplitudes, or they may be attributes derived from the amplitudes of the seismic data, such as RMS values and/or spectral values. In a migrated QC cube, the attributes may include seismic velocity, seismic fold and distribution of source-receiver azimuths.

18 Claims, 6 Drawing Sheets

350→

→ Shot

QUALITY CONTROL CUBE FOR SEISMIC DATA

CROSS-REFERENCES TO RELATED APPLICATIONS

This applications claims priority from U.S. Provisional patent application Ser. No. 60/235,664 filed on Sep. 26, 2000

BACKGROUND OF THE INVENTION

1. Field of the Invention

The present invention relates to the field of geophysical seismic data collection. More particularly, the present invention relates to an integrated system for collecting, storing and processing seismic and navigation data from an exploration prospect, and for enhancing quality control of such data.

2. Background of the Art

Seismic exploration investigates the geophysical structure of formations underlying water. In marine seismic exploration, seismic source arrays are towed by one or more vessels through the water, and sensor arrays detects signals generated by wave reflections from subsurface geologic formations. The seismic source array utilizes air guns or other repeatable sources, and the sensor array typically utilizes hydrophones or other transducers. One or more seismic lines in the same geographic area define a survey, and a collection of one or more related surveys typically define an exploration prospect As the seismic source array passes over the exploration prospect, the source waves travel downward through the sea floor and the subsurface formations. Portions of the seismic wave energy are reflected back into the water by the sea floor and by interfaces between subsurface rock layers. The returning reflected waves generate pressure pulses, and the sensor array generates output signals representing such pressure pulses. The output signals are recorded on tapes and can be processed to identify certain relationships. For example, the propagation time of a seismic wave from a reflection point is proportional to the depth of the reflection point, and the processed output signals can be merged with position data to generate topographical representations of the subsurface formations.

Marine seismic data acquisition collects vast quantities of seismic and positioning data, and such data represents numerous parameters having multiple error sources. Wind, waves, and currents physically move the seismic streamers relative to the tow vessel in a "feathering angle" relative to the tow vessel heading. A relatively small feathering angle of five percent may offset a streamer point hundreds of meters from the survey line. Errors also occur due to the dispersal of the subsurface wave path reflection points, the occurrence of source and receiver offsets, the inclination of the reflecting surfaces, and because of other factors. The accuracy and usefulness of seismic data requires that multiple data processing procedures accurately locate the data points representing the seismic data.

3-D seismic acquisition on land also generates large quantities of seismic data from a plurality of seismic sources and a plurality of seismic detectors. The acquisition geometry is designed to provide data having high multiplicity of coverage of the subsurface, preferably over a wide range of source-receiver azimuths.

Various data gathering systems collect and process seismic data. In U.S. Pat. No. 4,787,069 to Beauducel et al., electronic modules filtered and amplified signals near each seismic receiver, and an acquisition apparatus digitized, stored and multiplexed signals from the seismic receivers to a ship-based central control and recording device.

U.S. Pat. No. 4,635,237 to Benestad et al. discloses a system for transmitting information between seismic data acquisition devices and a central receiver. Benestad describes how conventional seismic data acquisition systems have multiple electrical contacts and connectors which increase the probability of faults. Arbitrary faults due to an electronic malfunction are identified by a data selector which screens data before the data is entered into the data stream. An extra data transmission line is included for transmitting a data stream following a line break or short-circuit in one of the ordinary transmission lines, and a signal indicating the error is sent to a central control unit.

U.S. Pat. No. 4,561,073 to Aeter et al. discloses a system for sorting seismic data in a marine survey by sorting the data into defined squares, and evaluating the measurement results for each square. By categorizing the data into geographic squares, errors and deviations caused by wind and other conditions are evaluated before the entire data set is processed. If sufficient data for such geographic space is not received, additional seismic data for such geographic space could be acquired.

In U.S. Pat. No. 4,663,743 to Rampuria et al., a data transcriber system receives data in a first medium and outputted the data in a second medium. The transcriber system permits detection and correction of data errors. However, the system requires significant operator intervention to set processing parameters, to choose transcription types and input modes, to view input parameters, to modify data, and to output the data.

In U.S. Pat. No. 4,759,636 to Ahern et al., surrogate seismic signals are produced from multiple selected channels on a real time basis to represent the detected seismic data. These surrogate signals are generated by sampling the multiplexed seismic signal at selected time intervals. The surrogate signals consolidate the data quantities transmitted to a central processor for processing and interpretation. The surrogate signals are further used to evaluate the data quality control and to evaluate and optimize data acquisition parameters.

U.S. Pat. No. 4,682,307 to Newman also seeks to provide a real-time data processing system by reducing the processed data. A single seismic source and a single receiver produce single trace data for processing, thereby reducing the total volume of data processed.

The emergence of 3-D data seismic processing as a geophysical tool and of multiple, large streamer arrays towed behind seismic vessels results in additional data available for processing. Known processing systems that selectively sampled the data sets ignore much of the available data.

U.S. Pat. No. 5,920,828 to Norris et al. teaches an automated quality control system for collecting seismic data from a seismic acquisition system, and for processing data from a marine navigation system. The invention includes a seismic data storage engaged with the seismic acquisition system for receiving and storing seismic data, a seismic data processor engaged with the seismic data storage for processing seismic data, a prospect data logger for accessing the positioning data and for coordinating seismic data processing and for identifying and storing attributes and data, and a terminal communicating with the prospect data logger for permitting commands to be transmitted to the prospect data logger.

However, even with the most sophisticated systems, quality control (QC) of the acquisition of the vast amount of data present in a typical 3-D seismic acquisition remains problematic. In particular, present systems do not take into account patterns of disturbances in a typical 3-D seismic data volume caused by common sources of errors and noise. There is a need for a display system that makes visualization of these disturbances in a 3-D data acquisition easier. The present invention satisfies this need.

SUMMARY OF THE INVENTION

The present invention is a method for displaying, attributes of the quality of seismic data in seismic data acquisition and processing. The data may have been acquired in a receiver-based acquisition geometry (e.g., from single-component or multi-component ocean-bottom cables) or from a shot-based acquisition geometry (e.g., from towed sources and receivers). In one embodiment of the invention, the attributes of the quality of the seismic data are displayed in a hypercube with the coordinate axes related to the acquisition geometry. In an alternate embodiment of the invention, three mutually orthogonal axes are defined to describe the relative positions of each pre-stack trace of seismic data. Using visualization methods that have been developed to display attributes of seismic data indicative of subsurface geology, the present invention displays attributes indicative of the quality of the seismic data itself. In the 3-D display, certain kinds of disturbances that affect the quality of the seismic data have associated patterns in the 3-D volume that make diagnosis of problems in the data acquisition easier.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENTS

Displays of seismic attributes in a 3-D data volume have been widely used in seismic data interpretation. Such displays typically show features of processed seismic data wherein typically the raw data have been processed to produce a stacked or a migrated seismic section.

For example, U.S. Pat. No. 5,563,949 to Bahorick et al teaches dividing the three-dimensional volume into a plurality of vertically stacked and generally spaced apart horizontal slices; dividing each of the slices into a plurality of cells; measuring across each of the cells the cross-correlation between one pair of traces lying in one vertical plane to obtain an inline value and measuring the cross-correlation between another pair of traces lying in another vertical plane to obtain a crossline value that are estimates of the time dip in an inline direction and in a crossline direction; combining the inline value and the crossline value to obtain one coherency value for each of the cells; and displaying the coherency values of the cells across. Such a coherency display is particularly well suited for interpreting fault planes within a 3-D seismic volume and for detecting subtle stratigraphic features in 3-D. This is because seismic traces cut by a fault line generally have a different seismic character than traces on either side of the fault. Measuring trace similarity, (i.e., coherence or 3-D continuity) along a time slice reveals lineaments of low coherence along these fault lines. Such coherency values can reveal critical subsurface details that are not readily apparent on traditional seismic sections. Also by calculating coherence along a series of time slices, these fault lineaments identify fault planes or surfaces.

U.S. Pat. No. 5,892,732 to Gersztenkorn discloses a modification of the Bahorich invention wherein a covariance matrix is determined for each of the cells and a seismic attribute determined from the eigenvalues of the covariance matrix is displayed. Gersztenkorn teaches that the ratio of the dominant eigenvalue of the covariance matrix to the sum of the eigenvalues is an indication of the coherence of the data.

U.S. Pat. No. 6,055,482 to Sudhakar et al. teaches display of other types of seismic attributes in a 3-D data volume. For example, azimuth ordered seismic gathers are used to identify subterranean features such as fault and fracture patterns. Offset ordered coherence analysis is used to form an optimum stack at the subterranean location of interest.

While the patents described immediately above are quite useful in seismic interpretation and in visualization of large quantities of seismic data, prior art does not take advantage of the visualization features of a 3-D seismic volume at a more fundamental level, namely in quality control of the seismic data itself.

Figure 1A:
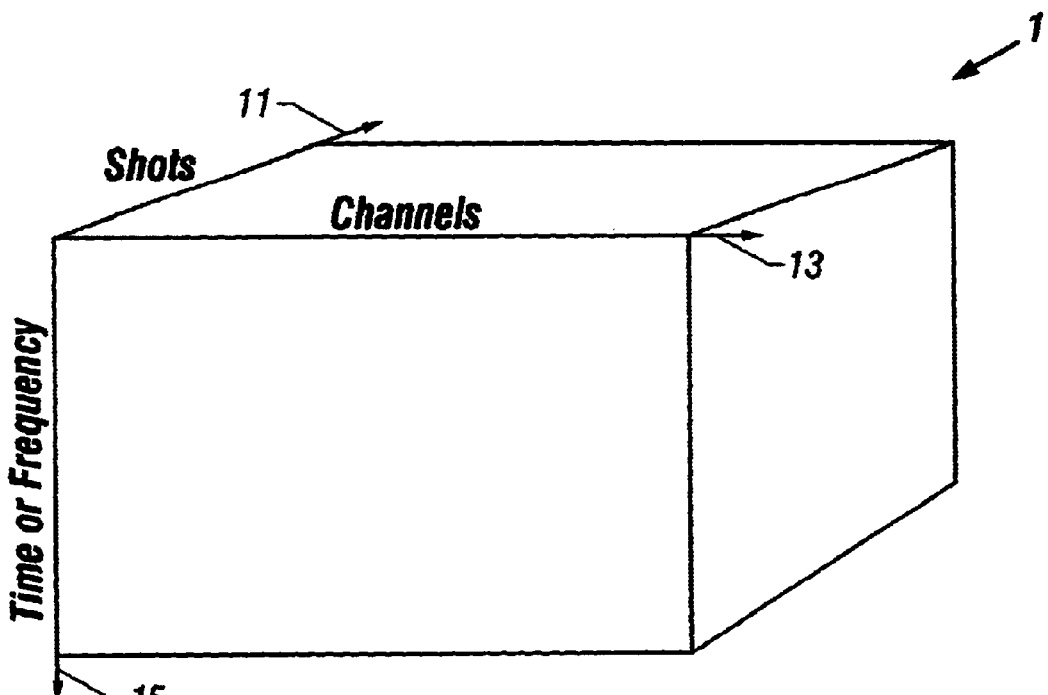
FIG. 1 is a schematic illustration of a the arrangement of a 3-D Quality Control (QC) cube.

Referring now to FIG. 1a, a schematic illustration of a 3-D QC cube 1 is shown. The cube 1 is shown in an perspective view and, for this example, corresponds to streamer data. As would be known to those versed in the art, in a typical marine streamer seismic acquisition, there would be a plurality of spaced apart seismic sources towed by one or more vessels and data are recorded into hydrophones carried on a plurality of seismic streamers. An example of such a system is described in U.S. Pat. No. 6,028,817 to Ambs, having the same assignee as the present invention and described below in reference to FIG. 2.

The acquisition system in Ambs comprises a source vessel 20 towing a plurality of seismic sources 25 and a plurality of streamers 22 that carry sensor (hydrophone) sections 21. Additional tow vehicles 30 carry other streamers 22 with sensor sections. As the source vehicle 20 traverses the surface of a body of water, the sources 25 periodically emit seismic energy that propagates into the earth. Reflections of this seismic energy from subterranean formations (not shown) are received by the sensors in the sensor sections 21 and are used to provide an image of the subsurface. Additional sources may be deployed as necessary to provide a comprehensive image of the subsurface. The Ambs patent is intended to be an example of a marine seismic data acquisition system for which the present invention may be used and is not intended to be a limitation.

Figure 1B:
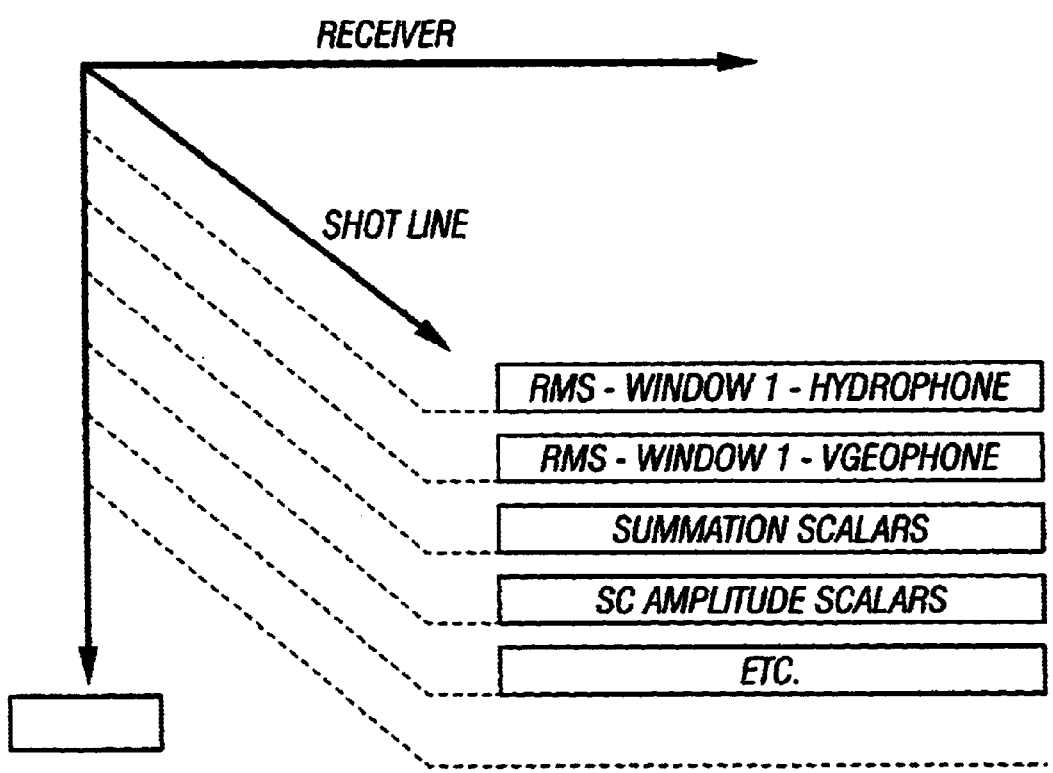
Figure 2:
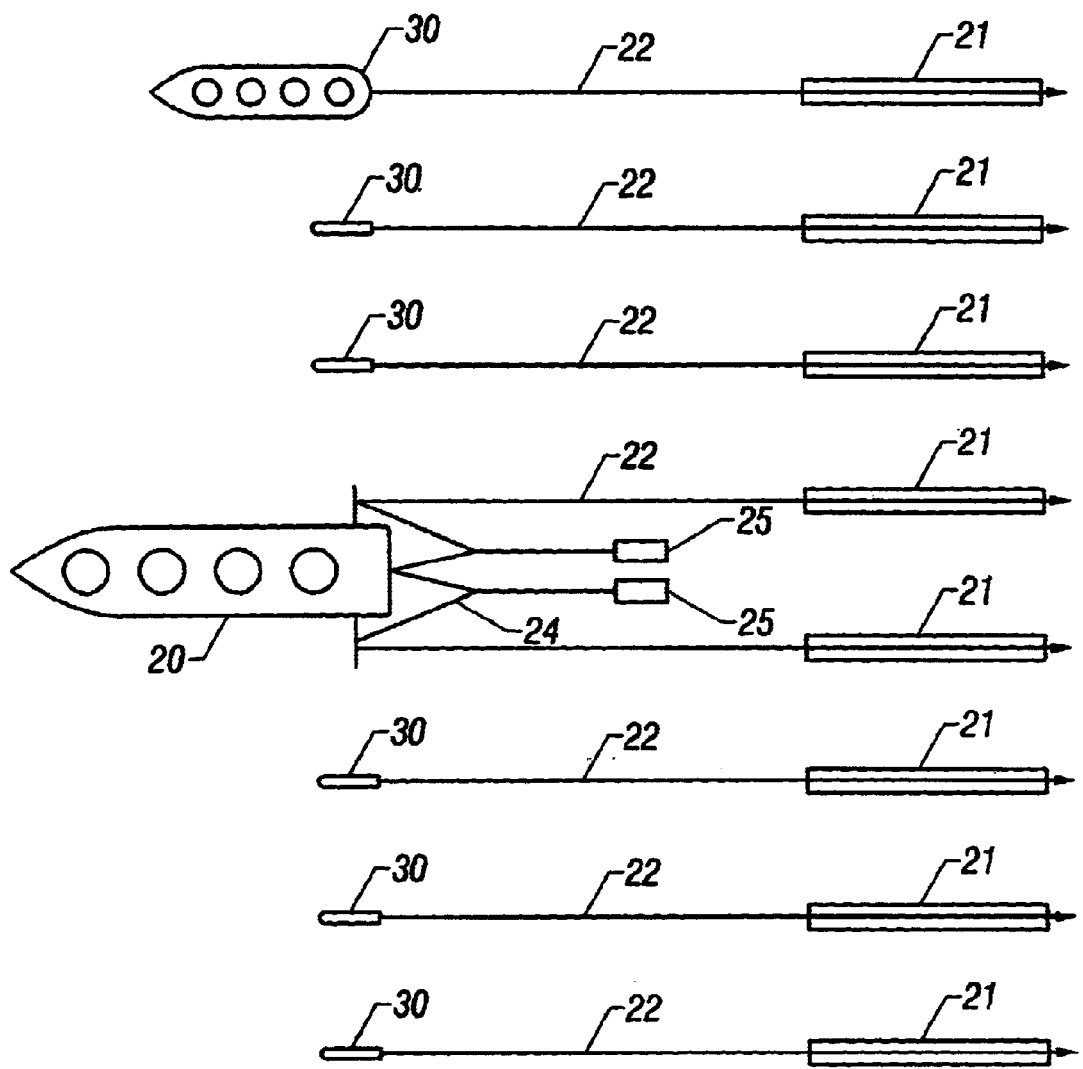
FIG. 2. (PRIOR ART) shows an example of a marine seismic data acquisition system employing streamers carried by independently powered tow vehicles.

For the system of Ambs, a preferred embodiment of the present invention includes a QC cube for each combination of a source and a streamer cable. Returning now to FIG. 1, a single QC cube is characterized by three axes. The axis 13 corresponds to the receiver or channel number on one of the receiver sections described above. The axis 11 corresponds to the shot number and, since the seismic sources 25 in FIG. 2 are in motion, different positions along the axis 11 have associated spatial positions of the source locations. The vertical axis in the example shown in FIG. 1*a* may be time or frequency corresponding to which QC attributes of the acquired seismic data may be displayed.

In a receiver-based acquisition geometry (not shown), seismic data are acquired by seismic sensors deployed along receiver lines on the bottom of a body of water. The sensors may be multi-component sensors. Seismic excitation is provided by a seismic source deployed behind a source vessel traveling in the body of water. FIG. 1*b* shows an example of a QC cube corresponding to such an acquisition geometry. The horizontal axes correspond to shot line and receivers while the vertical axis corresponds to QC attributes of the seismic data. In FIG. 1*b*, these attributes include, without limitation, the RMS values over a window of a hydrophone and a vertical geophone.

The QC cube is thus seen to comprise three orthogonal axes such that each prestack seismic trace is associated with a point along two of the three orthogonal axes. The third axis is associated with attributes of the ensemble of pre-stack seismic traces. For streamer acquisition, the pre-stack seismic traces are defined in terms of shot and channel number on the streamer (see FIG. 1*a*) while for receiver based acquisition, the pre-stack traces are defined in terms of receiver and shot (see FIG. 1*b*).

Figure 3:
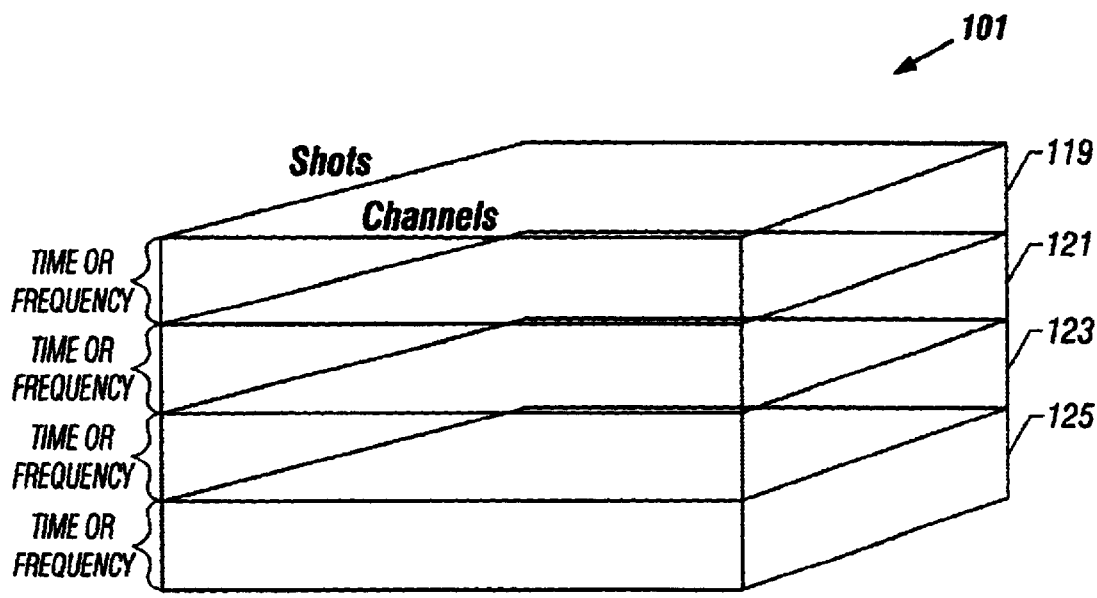
FIG. 3 shows a QC cube comprising a plurality of cubelets.

Turning now to FIG. 3, an embodiment of the invention is shown wherein the QC cube 101 comprises a number of mini-cubes 119, 121, 123 . . . For illustrative purposes and without intended as a limitation, four such mini-cubes are shown. Each of the mini-cubes cubes may display a different QC attribute. There is no limitation that all of the mini-cubes must have the same vertical axis.

Figure 4:
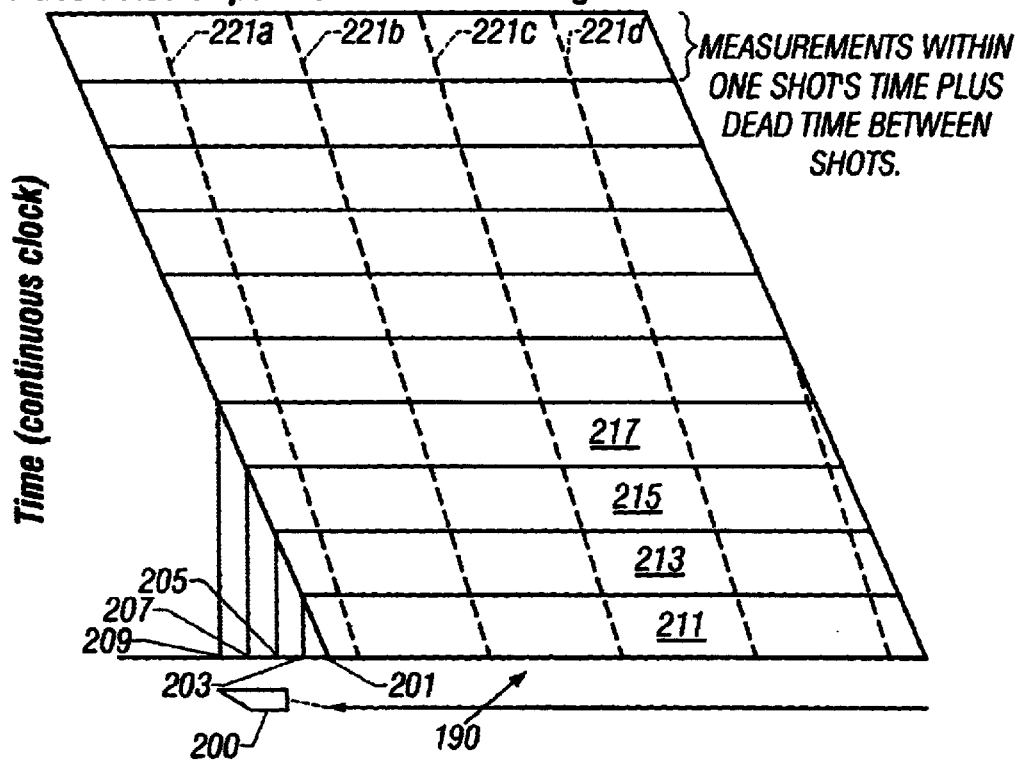
FIG. 4 illustrates the appearance of sea-swells on a seismic data acquisition system for continuous data recording.
Figure 5:
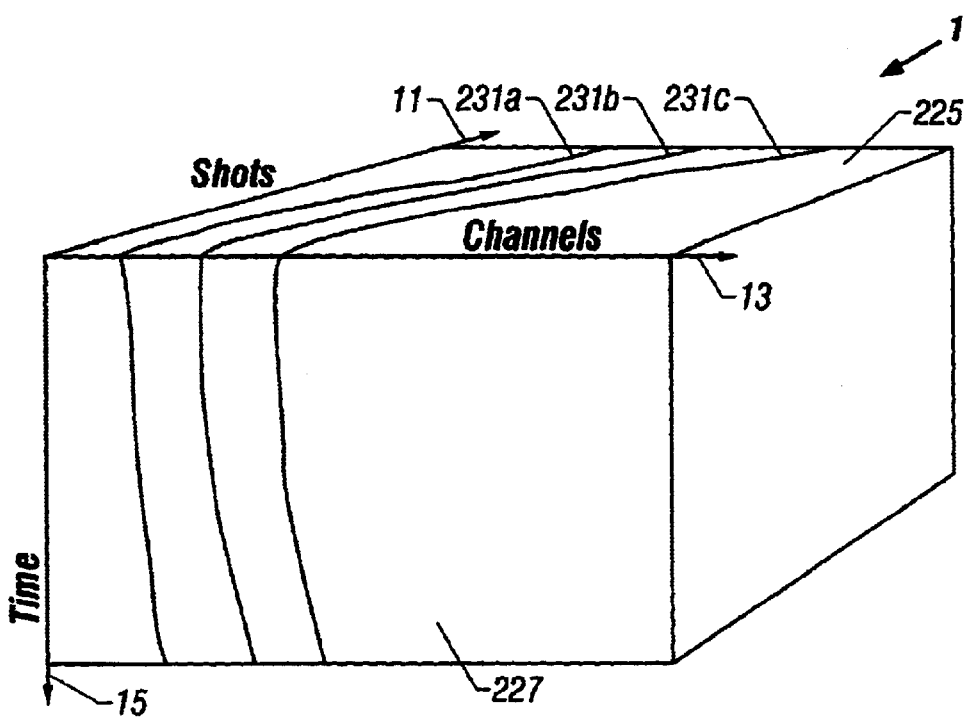
FIG. 5 is a schematic illustration of the sea-swell noise of FIG. 4 on a QC cube.

Turning now to FIG. 4, an example of a common type of noise that shows up on seismic data is indicated. A seismic boat 200 with a streamer 190 is shown at one time when the source is at location 201. The data recorded when the source is at location 201 is indicated by the region 211. At the next excitation of the source at location 203, in a continuous data recording system, the data recorded are denoted by the region 213. In a similar manner, regions 215, 217 . . . denote data recorded for sources at 205, 207 . . . etc. In the continuous data recording system, swells in the body of water produce strong interference as indicated by the lines 221*a*, 221*b*, 221*c* . . . 221*n*. Those versed in the art would recognize that curve 221*a* maps into a surface with a trace 231*a* on the upper surface 225 and front surface 227 of a QC cube with time as the vertical axis as shown in FIG. 5. Similarly, the swell denoted by line 221*b* maps to 231*b*, 221*c* to 231*c* etc. On a QC cube display, swells have a characteristic pattern associated with them.

Figure 6:
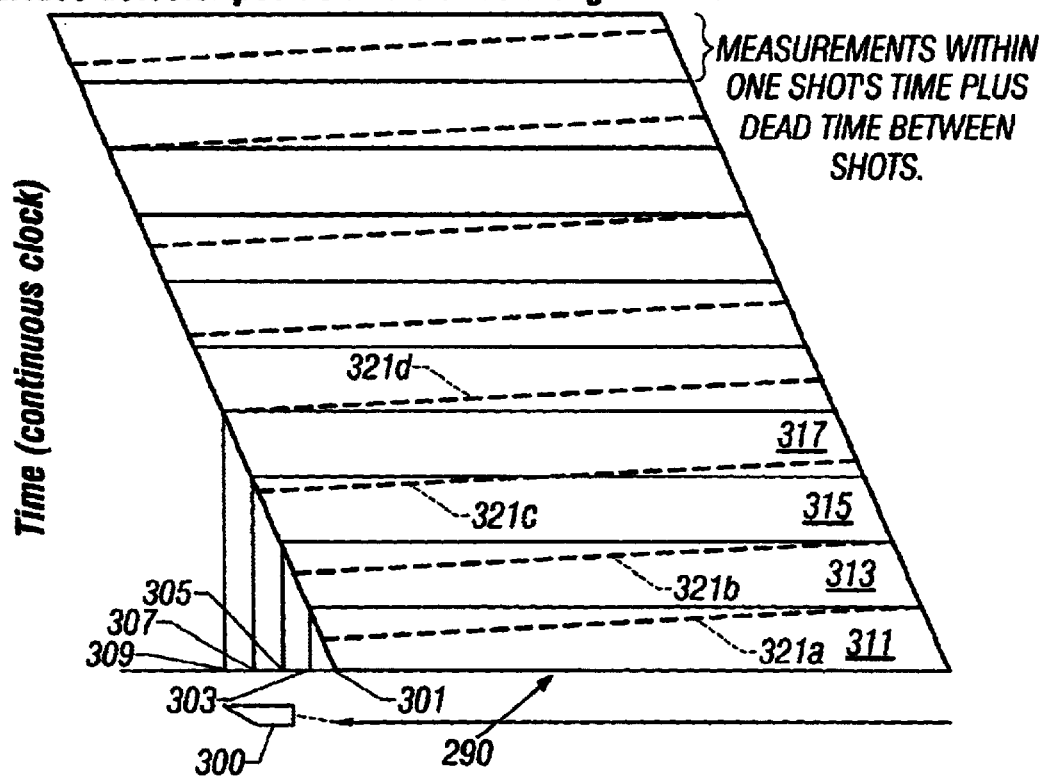
FIG. 6 illustrates the appearance of noise from another seismic crew on a seismic data system for continuous recording.

Another example of a noise source that shows up on a simple display of the amplitude of seismic traces is interference from another seismic survey crew in the vicinity. FIG. 6 shows a display similar to FIG. 4 for a continuous seismic data recording system with a streamer 290 with the source being excited at locations 301, 303, 305 . . . . The corresponding data would occupy regions denoted by 311, 313, 315 . . . . If there is another seismic crew in the vicinity acquiring seismic data, the strongest interfering noise from the other seismic crew would be direct signals through water showing up as lines such as 321*a*, 321*b*, 321*c* . . . . The spacing between these need not be regular. This kind noise too would have a characteristic pattern associated with a display in the QC cube.

The examples discussed above were simple illustrations of QC using simple time displays of the data. Similar displays may also be obtained using QC attributes derived from the seismic data. These may include amplitude measures (amplitude within one or more time windows), bandwidth measures (spectral bandwidth within one or more windows), frequency measures (dominant frequency within one or more windows).

Figure 7A:
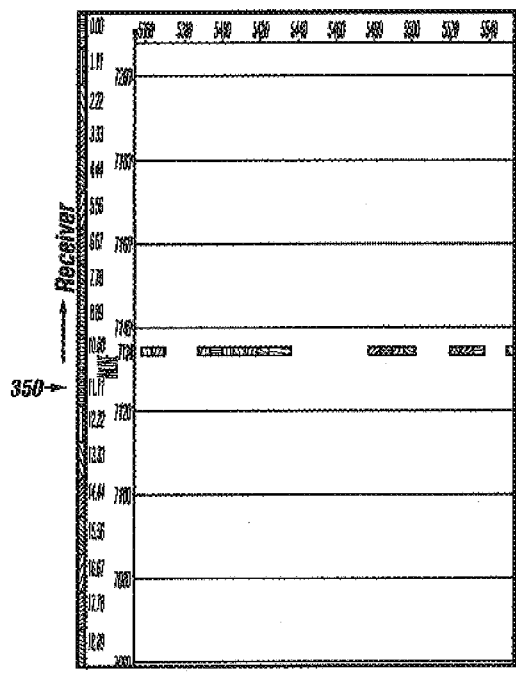
FIGS. 7a and 7b show a vertical section through a QC cube with anomalous RMS amplitude levels for a particular receiver and the corresponding seismic data.
Figure 7B:
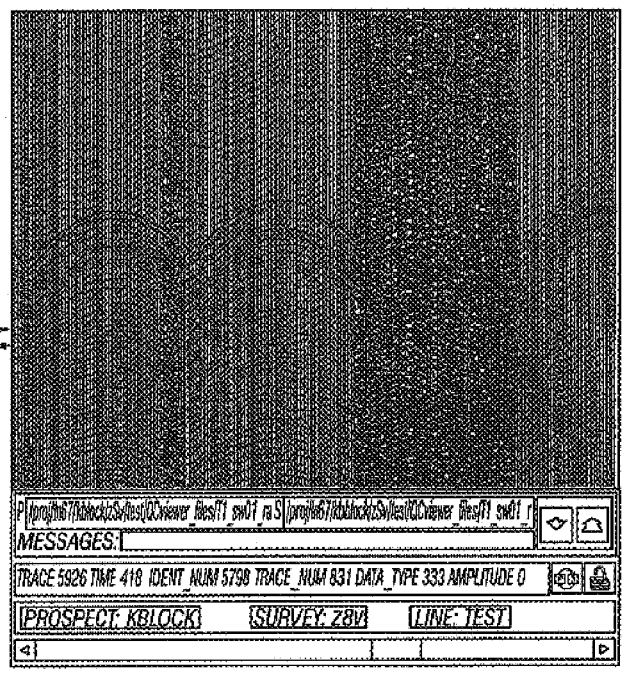

Turning now to FIG. 7*a*, a display of a slice of a QC cube is shown with the horizontal axis being the shot number and the vertical axis the receiver number. The data were acquired with receivers on the water bottom and the seismic source traversing the body of water. Displayed is RMS amplitude level within a time window. A particular receiver, denoted by 350 has an RMS amplitude that is that is intermittently anomalously high. One aspect of the invention is being able to identify anomalous regions in the QC display and to display corresponding raw data. FIG. 7*b* shows the raw data corresponding to the receiver 350 in FIG. 7*a*. The noisy data can be clearly seen in the section.

The examples discussed above have related mostly to QC visualization of so-called surface consistent data. Another embodiment of the invention performs QC visualization of "post-migration" QC cubes. Here, the data are processed and may be migrated to discrete bin locations using known methods. In the migrated domain, QC attributes of the data may be displayed. Some of these attributes may be similar to those discussed above, such as RMS amplitude with time windows. Others, such as seismic velocities, and are indicative of the quality of data processing. Other types of QC attributes such as fold and fold distribution with azimuth relate to the acquisition geometry, something that will affect the quality of the migrated output. Those versed in the art would be familiar with these attributes and they are not discussed further here.

Migration is only one example of the type of seismic processing that is carried out on seismic data. The method of the present invention may be used for quality control of other types of processing, and the geometry of the QC cube is selected to be appropriate for the kind of processing being carried out. A generic term of "post-processing" QC cube described such displays, with the "post-migration" QC cube being a special example thereof.

Figure 8:
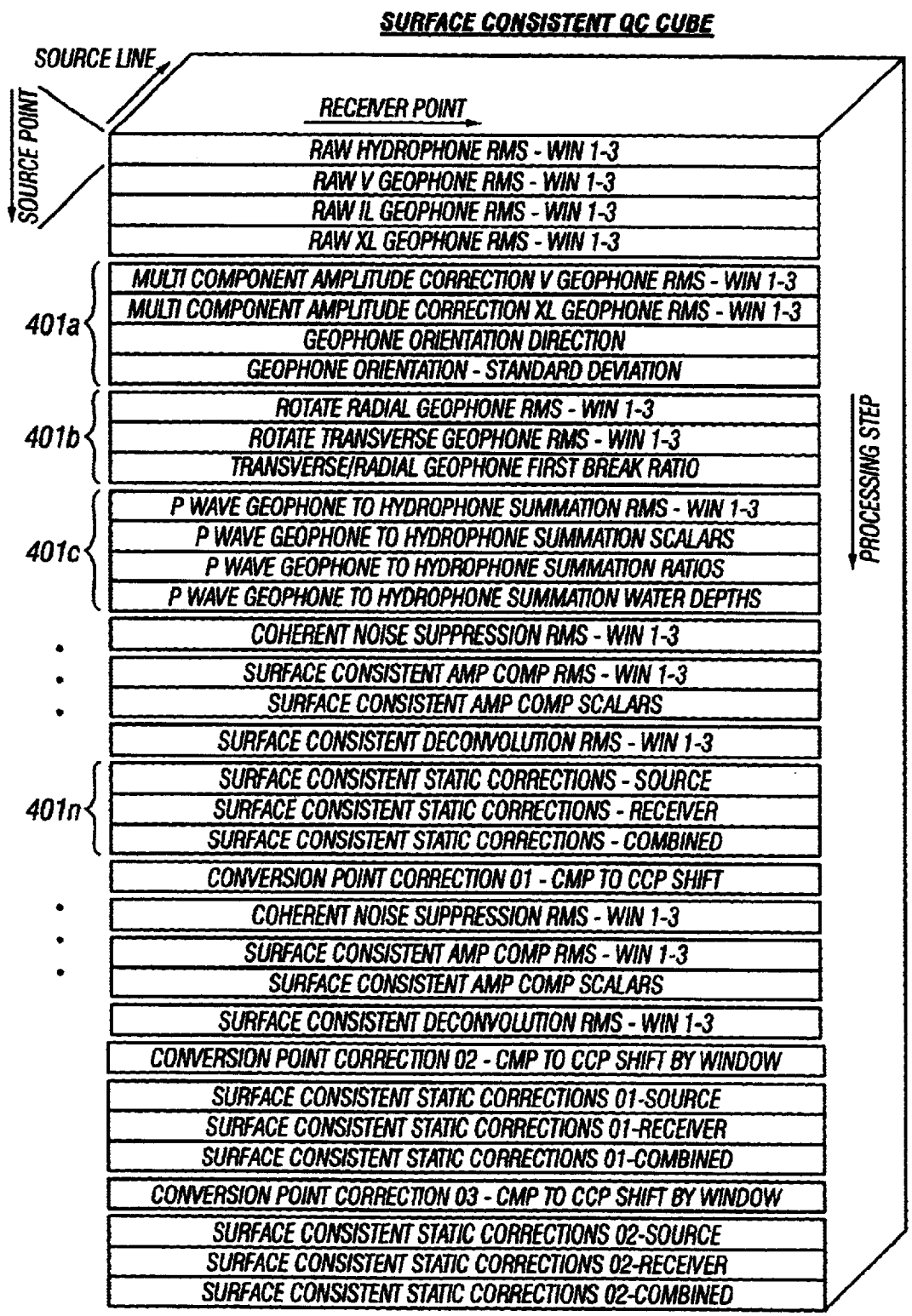
FIG. 8 illustrates the concept of a QC hypercube

Turning now to FIG. 8, a generalization of the concepts discussed above with respect to a 3-D QC cube is illustrated. The 3-D QC cube may be viewed as a 3-D projection of a 4-D QC hypercube. This is difficult to illustrate in a 2-D projection on a sheet of paper. However, the additions dimension is given by way of example with the processing steps 401*a*, 401*b*, 401*c* . . . 401*n*. These are examples of processing operations that are commonly carried out with seismic data. For example 401*a* denotes data that would result from an operation of amplitude correction and determination of geophone orientation. 401b in the example denotes data that would result from a rotation of the geophone data. 401c represents data that would result from combining data from geophones and hydrophones. 401n denotes that would result from a surface consistent static correction. It is not necessary that all of these processing steps be carried out and depending upon the data acquired, some steps would not be carried out. For this reason, no illustration is provided of a processing "sequence" since there is no universal processing sequence that is applicable to all seismic data. After each of these processing operations, data may be displayed in a 3-D cube with axes defined, e.g., by source line, receiver point and source point. Conceptually, the processing operations as applied to the data may be represented by a 4-D hypercube in which the fourth dimension represents a processing step. This is impossible to do on a sheet of paper, but FIG. 8 is an attempt to depict such a hypercube in a drawing. After each processing operation such as 401a, the full range of source points would be present. At the most basic level, this could include one or more of the raw hydrophone RMS within one or more time windows; the raw vertical geophone RMS within one or more windows; the raw horizontal geophone (longitudinal and/or transverse components) RMS within one or more windows; the Multi-component amplitude correction for the vertical and horizontal geophories over one or more windows; the geophone orientation and the standard deviation of the geophone orientation. With some additional processing, this could include the rotated radial and transverse RMS within one or more time windows; the ratio of the first break on the transverse and radial component. With additional processing this could include the RMS of the PP obtained by summation of multicomponent data over one or more time windows; various summation scalars; summation ratios; summation of water depths; RMS values following coherent noise suppression; amplitude compensated RMS values; surface consistent amplitude compensated values; surface consistent source, receiver and combined statics, conversion of CMP to CCP etc. Examples of these scalars are given in FIG. 8 and are not intended to be limiting; those versed in the art would recognize other parameters of processed data that would be diagnostic of the quality of acquired and/or processed data. It would also be clear to those versed in the an that the assignment of particular axes of the hypercube to selected real-world features is arbitrary and that they could be interchanged.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of visualizing quality of seismic survey data acquired in a seismic survey, the method comprising:
    (a) defining a Quality Control (QC) cube having at least three orthogonal axes; and
    (b) displaying values associated with a selected parameter of the seismic data for a plurality of points in said QC cube, said selected parameter being obtained without a linear moveout analysis of said data;
    wherein the axes of the cube include at least one item selected from the group consisting of (i) source point locations, (ii) receiver point locations, (iii) source lines, (iv) receiver lines, (v) processing steps, (vi) time windows of processing steps, and (vii) offset windows of processing steps.

2. The method of claim 1 wherein the at least three orthogonal axes comprise at least four orthogonal axes.

3. The method of claim 1 wherein said parameter is selected from the group consisting: one or more of: a raw hydrophone RMS within one or more time windows; a raw vertical geophone RMS within one or more windows; a raw horizontal geophone (longitudinal and/or transverse components) RMS within one or more windows; a Multi-component amplitude correction for vertical and horizontal geophones over one or more windows; a geophone orientation and a standard deviation of the geophone orientation; a rotated radial and transverse RMS within one or more time windows; a ratio of a first break on a transverse and radial component; an RMS of a PP obtained by summation of multicomponent data over one or more time windows; a summation scalars; a summation ratio; a summation of water depths; RMS values following a coherent noise suppression; amplitude compensated RMS values; surface consistent amplitude compensated values; surface consistent source, receiver and combined statics, and conversion of CMP to CCP.

4. The method of claim 1 wherein said seismic survey is a receiver based survey using at least one line of seismic sensors on the bottom of a body of water.

5. The method of claim 1 wherein said seismic survey is a 3-D land seismic survey using a plurality of seismic sources and a plurality of seismic receivers.

6. The method of claim 1 wherein said seismic survey is a 3-D marine seismic survey using at least one seismic source along a plurality of source lines and a plurality of seismic receivers carried on streamer cables.

7. A method of visualizing quality of seismic survey data acquired in a seismic survey, the method comprising:
    (a) defining at least one Quality Control (QC) cube having three orthogonal axes, wherein
        (i) each of a plurality of unmigrated seismic traces in the survey defines a point along two of said three orthogonal axes; and
        (ii) a third of said three orthogonal axes is associated with at least one attribute of quality of said plurality of unmigrated seismic traces, said attribute being obtained without a linear moveout analysis of said seismic traces;
    and
    (b) displaying said QC cube.

8. The method of claim 7 wherein said seismic survey is a marine survey acquired using at least one towed seismic source and at least one towed streamer, and wherein said two of the three orthogonal axes are selected from the group consisting of (i) shot number and channel number, and, (ii) shot and station position.

9. The method of claim 8 wherein said at least one source comprises a plurality of sources, and said at least one QC cube comprises a plurality of cubes.

10. The method of claim 8 wherein said at least one streamer comprises a plurality of streamers and said at least one QC cube comprises a plurality of cubes.

11. The method of claim 8 wherein said attribute is selected from the set consisting of (i) an amplitude of a unmigrated trace as a function of time, (ii) a root mean square (RMS) amplitude of an unmigrated trace within at least one time window, (iii) a bandwidth of an unmigrated seismic trace within at least one time window, and (iv) a dominant frequency of an unmigrated seismic trace within at least one time window.

12. The method of claim 7 wherein said seismic survey is a receiver based survey using at least one line of seismic sensors on the bottom of a body of water.

13. The method of claim 12 wherein said two of the three orthogonal axes are receiver position and shot position.

14. The method of claim 13 wherein said at least one line of seismic sensors comprises a plurality of sources, and said at least one QC cube comprises a plurality of cubes.

15. The method of claim 12 wherein said attribute is selected from the set consisting of (i) an amplitude of an unmigrated trace as a function of time, (ii) a root mean square (RMS) amplitude of an unmigrated trace within at least one time window, (iii) a bandwidth of an unmigrated seismic trace within at least one time window, and (iv) a dominant frequency of an unmigrated seismic trace within at least one time window.

16. The method of claim 7 wherein said seismic survey is a 3-D land seismic survey using a plurality of seismic sources and a plurality of seismic receivers.

17. A method of visualizing quality of seismic data acquired in a seismic survey, the method comprising:
   (a) migrating each of a plurality of pre-stack seismic traces to an output bin location;
   (b) defining at least one Quality Control (QC) cube having three orthogonal axes, wherein
      (i) each of a plurality of output bin locations defines a point along two of said three orthogonal axes; and
      (ii) a third of said three orthogonal axes is associated with at least one attribute of quality of said plurality of said migrated seismic traces;
   and
   (c) displaying said QC cube;
   wherein step (a) is carried out befor steps (b) and (c).

18. The method of claim 17 wherein said attribute is selected from the set consisting of (i) an amplitude of a migrated trace as a function of time, (ii) a root mean square (RMS) amplitude of a migrated trace within at least one time window, (iii) a bandwidth of a migrated seismic trace within at least one time window, (iv) a dominant frequency of a migrated seismic trace within at least one time window, (v) a seismic velocity within at least one time window at a bin location, (vi) a fold of the seismic data at a bin location, and, (vii) a distribution of source-receiver azimuths at a bin location.

* * * * *